J. C. ROUND.
HEAT CONSERVER.
APPLICATION FILED AUG. 6, 1918.
1,306,281.
Patented June 10, 1919.
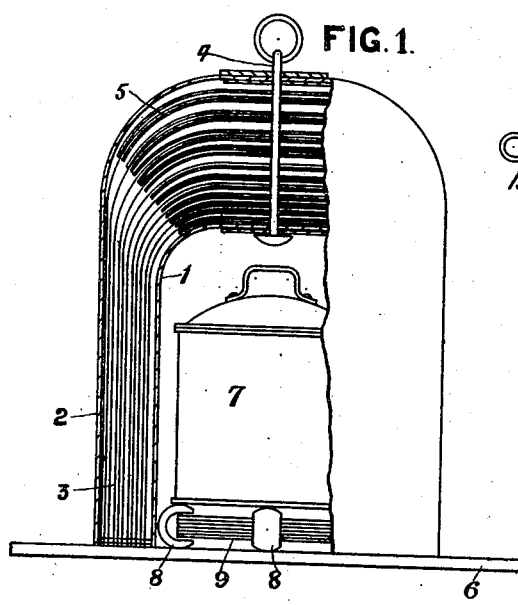
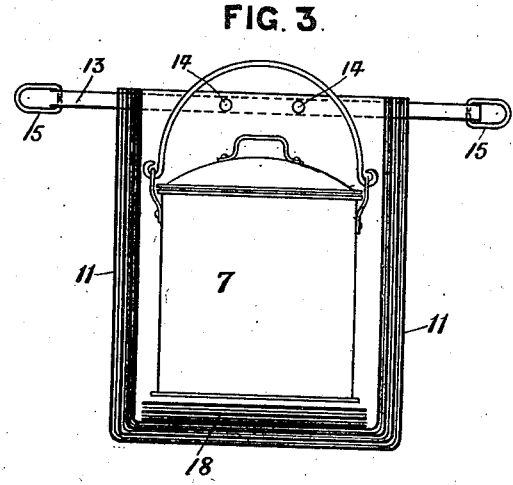
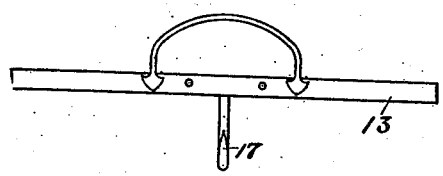
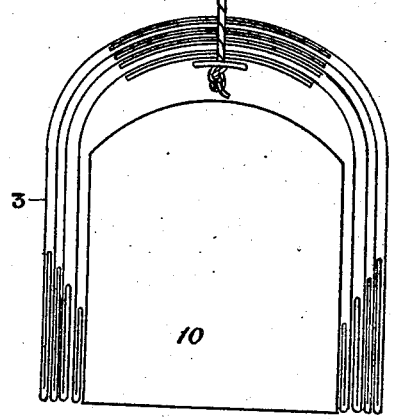
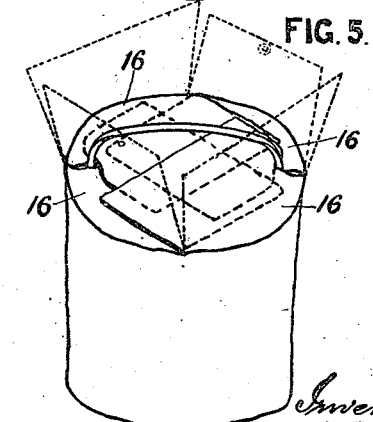
Inventor
John C. Round
by Herbert W. Jenner
Attorney.

UNITED STATES PATENT OFFICE.

JOHN CORNWELL ROUND, OF LONDON, ENGLAND.

HEAT-CONSERVER.

1,306,281.  Specification of Letters Patent.  Patented June 10, 1919.

Application filed August 6, 1918.  Serial No. 248,553.

*To all whom it may concern:*

Be it known that I, JOHN CORNWELL ROUND, a subject of the King of Great Britain, residing at "Purbrook," 19, Crescent Wood Road, Sydenham Hill, London, S. E. 26, England, have invented new and useful Improvements in Heat-Conservers, of which the following is a specification.

This invention has reference to apparatus for conserving heat, the main object being to limit the diffusion of heat from partially cooked food and to use such heat to continue the cooking of the food without the application of further heat, a further object is to construct the apparatus so as to be capable of being suspended and made easily portable and also to enable the vessel containing the food being cooked to be suspended within the apparatus. The invention is also applicable as an aid to annealing or any other purpose where it is desired that heat may be lost slowly.

The invention is illustrated by the accompanying drawings.

Figure 1 is a part sectional elevation of one form of the apparatus constructed according to my invention showing the vessel in which the partially cooked food is contained resting on projections which lift it up in the interior of the apparatus.

Fig. 2 is a sectional view showing a simple method of forming those parts of the apparatus which may be made of paper.

Fig. 3 is a sectional elevation showing a portable form of the apparatus made from air proof material interleaved with felt or other porous material.

Fig. 4 is a plan view of a similar form of the apparatus when closed made from a continuous roll of air proof material interleaved with felt, the vessel being removed.

Fig. 5 is a perspective view showing another method of closing the mouth of the portable form of apparatus in an approximately air tight manner.

Fig. 6 is a view of one of the bars for closing the apparatus illustrated by Figs. 3 and 4 showing a handle fixed thereto.

The apparatus consists of a series of nested covers formed or constructed so as to maintain air spaces between them. In the example shown by Fig. 1 the innermost cover 1 is preferably made of metal having a bright polished or enameled surface, or of silvered glass and the outer cover 2 also of metal or some firm protecting material. The intermediate covers 3 may be made of paper or similar or other relatively air proof material, or thin metal or metal foil; or alternately metal foil and paper or paper and felt or metal and asbestos, each intermediate cover being of a size to maintain air spaces between them. Thus it will be seen by increasing the number of intermediate covers that the number of air spaces are correspondingly increased. The intermediate covers are connected to the covers 1 and 2 preferably by a central connection 4 made of non-heat conducting material or other material made non-heat conducting by insulation. A washer or disk 5 is placed between each to maintain the air spaces and a connection may also be provided at the lower end to keep the intermediate covers spaced apart.

The nested covers rest upon a base 6 which is preferably insulated or made of non-heat conducting material, and in order to hold the vessel 7, in which the food to be finished cooking or kept warm is contained, up in the innermost cover 1 I support it upon raised projections 8 made of non-heat conducting material preferably shaped to permit the smallest point of contact between them and the vessel 7. These projections are preferably held in position by the part 9 which may be provided with insulating air space or spaces.

Fig. 2 shows a simple method of forming the intermediate covers 3 when made of paper. 10 represents a former or dummy upon which these covers are built up, the lower edge of the paper being folded upward to form or maintain the air space between each. These covers are united together at their apex by a piece of string a washer or thickening of paper being placed between each to keep them spaced apart. When the desired number of these intermediate covers has been built up the string is passed through a hole in the apex of the innermost and outer cover to which it is secured. Or the intermediate covers may be made from a continuous roll of paper or other relatively air proof material with spaces left between the spirals, the upper edges being drawn together to complete the covers. When the innermost cover 1 is made of metal or some stiff material it may be used as the dummy or former.

The outer cover 2 may be provided with catches for securing it to the base 6 to enable the whole apparatus to be carried by a handle secured to the apex.

At Figs. 3 and 4 I have shown an example of my apparatus constructed so that the handle of the vessel 7 containing the food to be kept warm or continue cooking can project through the mouth to enable it to be carried or suspended. In this case the apparatus is constructed in the form of a bag, the nested covers 11 being made of a flexible material such as impervious paper or metallic foil interleaved with felt or other porous material. Metallic air proof material may be attached to the inner and outer covers by an adhesive substance if desired. In the example shown by Fig. 3 the nested covers 11 and the interleaving are each formed separately but in that shown by Fig. 4 the nested covers and the interleaving are each made from a single piece of material wound in spiral form, the bottom being closed by stitching or otherwise.

The mouth of the apparatus is stiffened and made to close air tight by attaching two bars 13 to the edges of the covers by studs 14 which bars when the apparatus is closed may be held by clips 15 or otherwise. Or the closing device may be constructed somewhat similar to that of a brief bag. Or instead of stiffening the mouth of the apparatus for the purpose of closing same I may form four flaps 16 at the mouth of the apparatus as shown by Fig. 5 which flaps when folded over one on to the other and fastened close the mouth approximately air tight and at the same time permit the handle of the vessel 7 to project. The under flaps 16 are cut and shaped to act as packing beneath the outer flaps.

It will be seen as shown by Figs. 3 and 5 that the apparatus can be carried or suspended by the handle of the vessel 7 thus making the same easily portable. Or instead of the apparatus being carried or suspended by the handle of the vessel 7 I may provide handles on the bars 13 as shown by Fig. 6, in which case the vessel 7 is suspended by its handle in the interior of the apparatus by providing a hook 17 on one of the bars 13 (see Fig. 6).

In some cases instead of forming the whole of the outer cover 11 or any or all of the nested covers 11 of flexible material I may form the lower portion of such cover or covers of some stiff or rigid heat resisting material, the upper portion only being flexible to enable the mouth to be fully opened for the admission and withdrawal of the vessel 7, and I may line the innermost cover with impervious material to catch any condensation that may take place. A non-heat conducting base 18 may be provided in the interior of the apparatus for the vessel 7 to rest upon when not suspended.

What I claim as my invention and desire to secure by Letters Patent is:—

1. In a heat conserver, an outer cover, an inner cover which forms a heat-conserving chamber normally open at its bottom end, a series of intermediate covers arranged one within another and interposed between the inner and outer covers, separate and continuous air spaces being formed between all the said covers and extending around their sides and over their top portions, and means for closing the annular spaces between the bottom portions of the said covers.

2. In a heat conserver, an outer cover, an inner cover which forms a heat-conserving chamber, a multiplicity of intermediate covers formed of paper material and arranged one within another and interposed between the inner and outer covers, annular distance pieces arranged between the bottom end portions of all the said covers, and distance pieces or disks interposed between the tops of all the said covers, said distance pieces forming a continuous and separate air space between each two adjacent covers.

3. In a heat conserver, an outer cover, an inner cover which forms a heat-conserving chamber, a multiplicity of intermediate covers formed of paper material and arranged one within another and interposed between the inner and outer covers, said intermediate covers having their bottom end portions folded over to form distance pieces, and distance pieces or disks interposed between the tops of all the said covers, said distance pieces forming a separate and continuous air space between each two adjacent covers.

4. In a heat conserver, an outer cover, an inner cover which forms a heat-conserving chamber, a multiplicity of intermediate covers arranged one within another and interposed between the inner and outer covers, distance pieces interposed between all the covers and forming with them separate and continuous air spaces, and a fastening device extending centrally through the tops of all the covers and securing them together and having a handle at its upper end.

In testimony whereof I have signed my name to this specification.

JOHN CORNWELL ROUND.